United States Patent [19]
Schell et al.

[11] Patent Number: 6,025,839
[45] Date of Patent: Feb. 15, 2000

[54] METHOD FOR DISPLAYING INFORMATION IN A VIRTUAL REALITY ENVIRONMENT

[75] Inventors: David A. Schell, Durham, N.C.; Todd L. Leyba, Gaithersburg, Md.

[73] Assignee: International Business Machines Corp., Armonk, N.Y.

[21] Appl. No.: 08/871,018

[22] Filed: Jun. 6, 1997

[51] Int. Cl.[7] .................................. G06F 15/00

[52] U.S. Cl. ........................................... 345/334

[58] Field of Search ..................... 345/426, 427, 345/433, 419, 421, 422, 333, 334, 335

[56] References Cited

U.S. PATENT DOCUMENTS 5,835,094  11/1998  Erimel ..................................... 345/433

*Primary Examiner*—Phu K. Nguyen
*Attorney, Agent, or Firm*—A. Bruce Clay

[57] ABSTRACT

A method for displaying information in a virtual reality environment in which an object that is displayed within a viewport into the virtual reality environment is selected so that the contents of the object can be displayed. The object is opened and the contents of the object are automatically oriented to be perpendicular to a line of sight of the viewport.

4 Claims, 4 Drawing Sheets

METHOD FOR DISPLAYING INFORMATION IN A VIRTUAL REALITY ENVIRONMENT

BACKGROUND OF THE INVENTION

1. Field of the Invention

The present invention relates to the field of computer software. More particularly, the present invention relates to a method for visually representing information in a virtual reality world.

2. Description of the Related Art

When the contents of an object generated by a conventional virtual reality system are desired to be viewed, a user must change the viewport orientation, or angle of view. A viewport in a computer-modeled three-dimensional (3D) space is a portal, or a window, into the 3D space. That is, a viewport is the point in 3D space from which the 3D space is viewed. A person's eyes are similar to a viewport in that the person's eyes act as portals into physical space. A viewport occupies a position or location in 3D space which can be defined in a well-known manner using, for example, Cartesian (x,y,z) coordinates. Three dimensional objects that lie in front of the viewport are in view. Objects that lie behind the viewport are hidden from view. A viewport orientation is the orientation of a viewport at a particular point in 3D space to provide a particular line of sight into 3D.

When a computer-generated room in 3D space is navigated, the view provided by a viewport can be imagined to be like the view of looking through an empty picture frame. As the room is navigated, the imaginary picture frame is always positioned so that the line of sight of the viewport emanates through the empty frame perpendicular to the plane of the frame opening. Moving through the room involves changing the (x,y,z) coordinates of the location of the viewport. Turning left or right involves changing the yaw orientation of the viewport. Tilting one's head from side to side corresponds to changing the roll orientation of the viewport, though such a viewport orientation change is not normally done except by flight simulation-type applications. The pitch of the viewport plane is not normally changed when navigating a 3D room. However, in situations when the contents of an open drawer are viewed, conventional 3D display systems require that a user manually change the pitch of the viewport such that the view is like flying above the drawer and looking down into the drawer. Alternatively, the user is required to manually change the orientation of the object with respect to the pitch of the viewport for viewing the object contents.

What is needed is a system and a method that displays the contents of an object in 3D space without requiring a user to manually change the pitch of a viewport for viewing the contents of the object and without requiring the user to manually change the orientation of the object with respect to the pitch of the viewport for viewing the object contents.

SUMMARY OF THE INVENTION

The present invention provides a method in which the contents of an object that are desired to be viewed automatically change orientation so that a user can view the contents without having to manually change the pitch of a viewport and without having to manually change the orientation of the object with respect to the pitch of the viewport.

The advantages of the present invention are provided by a method for displaying information in a virtual reality environment in which an object that is displayed within a viewport into the virtual reality environment is selected so that the contents of the object can be displayed. The object is opened and the contents of the object are automatically oriented to be perpendicular to a line of sight of the viewport. Preferably, the step of orienting the contents of the object includes the steps of comparing the pitch of the viewport to an orientation of a frontal view of the contents of the object, translating the orientation of the frontal view of the contents of the object to be perpendicular to the pitch of the viewport when there is a difference between the pitch of the viewport and the orientation of the frontal view of the contents of the object, and displaying the translated orientation of the frontal view of the contents of the object.

The present invention also provides a program storage device having a storage area, and information stored in the storage area. According to the invention, the information is readable by a machine, and tangibly embodies a program of instructions executable by the machine for performing the method of the present invention. Preferably, the program storage is one of a storage device, such as a diskette or CD-ROM.

BRIEF DESCRIPTION OF THE DRAWING

The present invention is illustrated by way of example and not limitation in the accompanying figures in which like reference numerals indicate similar elements and in which.

DETAILED DESCRIPTION

Figure 1:
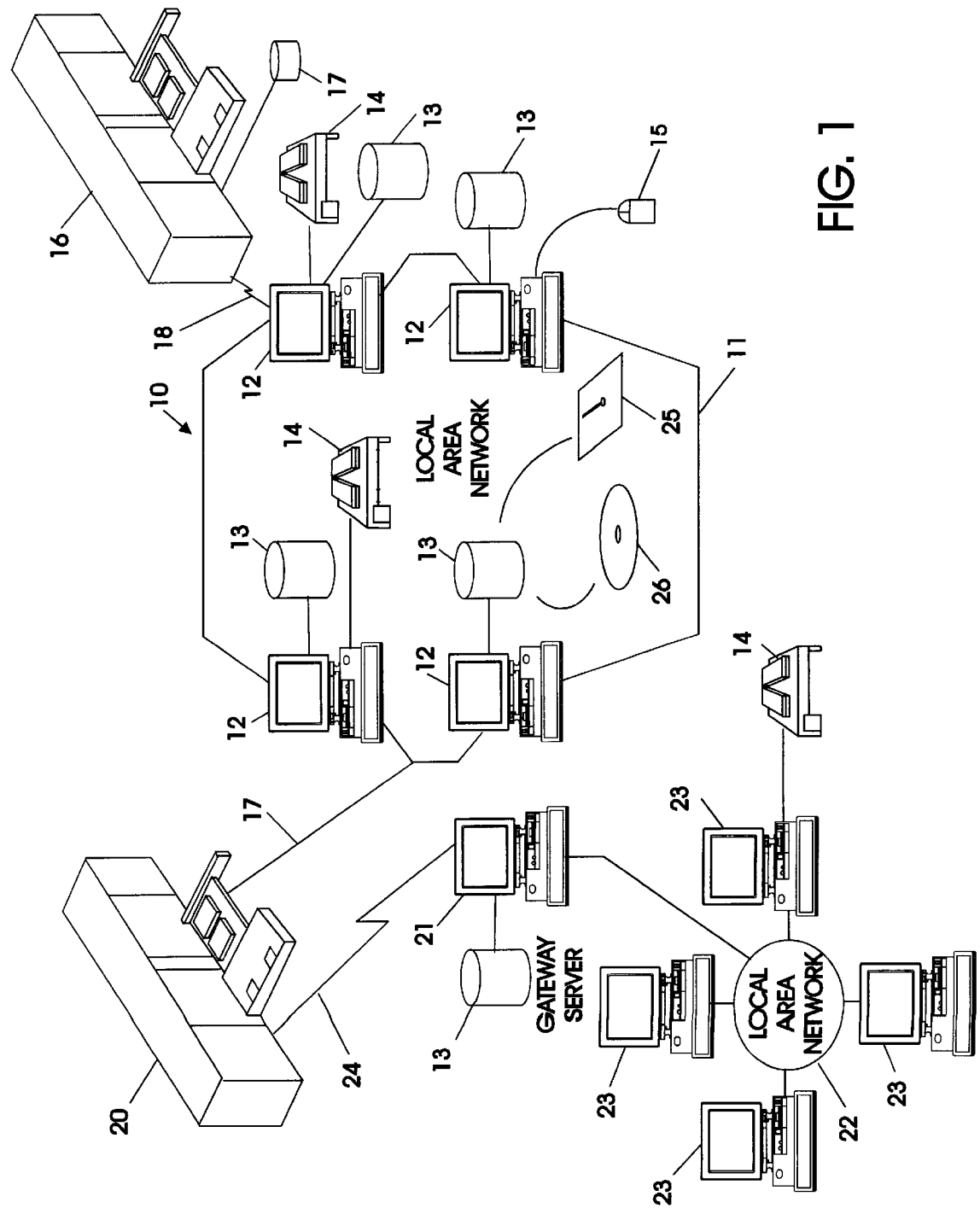
FIG. 1 is a schematic block diagram of an exemplary computing system in which the present invention may be utilized.

FIG. 1 is a schematic block diagram of an exemplary computing or data processing system 10 that can be utilized for implementing the present invention. Computing system 10 can include a plurality of networks, such as Local Area Networks (LAN) 11 and 22. Preferably, LAN 11 and 22 each respectively include a plurality of individual computers 12 and 23. A plurality of Intelligent Work Stations (IWS) coupled to a host processor can also be utilized for each such network. As is common in such data processing systems, each individual computer may be coupled to a storage device 13 and/or a printer/output device 14, and may be provided with a pointing device such as a mouse 15.

Computing system 10 may also include multiple mainframe computers, of which only mainframe computer 16 is shown. Mainframe computer 16 is preferably coupled to LAN 10 by communications link 18. Mainframe computer 16 can also be coupled to a storage device 17 that can serve as remote storage for LAN 10. Similarly, LAN 10 may be coupled via communications link 19 through a sub-system control unit/communications controller 20 and communications link 24 to a gateway server 21. Gateway server 21 is preferably an IWS that serves to link LAN 22 to LAN 11.

With respect to LAN 11 and LAN 22, a plurality of documents or resource objects maybe stored within storage device 17 and which are controlled by mainframe computer 16 as a resource manager or library service for the resource objects. Mainframe computer 16 can be remotely located from LAN 11 and, similarly, LAN may be remotely located from LAN 22. For example, LAN 22 may be located in California, while LAN 11 may be located in North Carolina and mainframe computer 16 may be located in New York.

Software program code which employs the present invention is typically stored in the memory of a storage device 13 of a stand-alone workstation or LAN server from which the code can be accessed for distribution purposes. The software program code may be embodied on any of a variety of known media for use with a data processing system, such as a diskette 25 or CD-ROM 26, or may be distributed to users from a memory of one computer system over a network of some type to other computer systems for use by users of such other systems. Each of storage device 13, diskette 25 and CD-ROM 26 includes a storage area having stored information that is readable by a computer and which tangibly embodies a program of instructions executable by the computer for performing the present invention. Such techniques and methods for embodying software code on media and/or distributing software code are well-known and will not be further discussed herein.

According to the invention, when the user communicates to an application a desire to view the contents of an object, the object opens in an orientation that allows the user to view the contents without the pitch of the viewport being required to be manually changed or without the orientation of the object's contents being required to be manually changed with respect to the pitch of the viewport. For example, when a desk drawer or a filing cabinet drawer is opened, indicating to the application that the user desires to view the contents of the drawer, the drawer opens to its fullest extent and the contents are displayed in an upright manner so that the user is not required to reorient the view port to look into the drawer.

Figure 2:
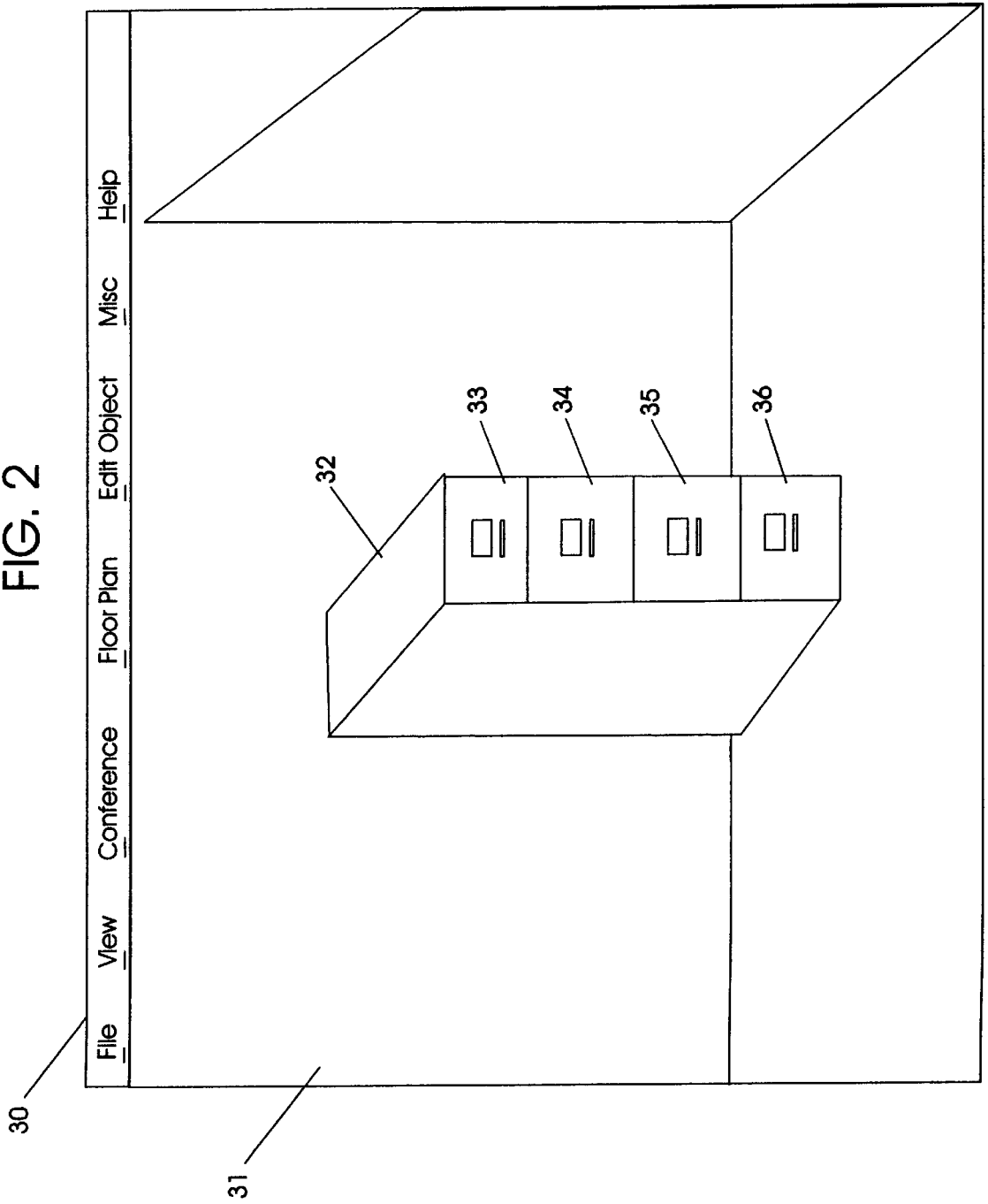
FIG. 2 shows a pictorial representation of a graphical display of an exemplary virtual reality environment according to the present invention.

FIG. 2 is a pictorial representation of a graphical display appearing in a computer screen window 30 showing a portion of an exemplary virtual reality environment 31. Environment 31 is a virtual reality office that includes a storage cabinet 32 having drawers 33, 34, 35 and 36. Storage cabinet 32 is a 3D graphical representation of an object that contains files and/or other objects. To view files and/or objects contained in storage cabinet 32, a user navigates a cursor onto the desired drawer of storage cabinet 32 and clicks a mouse button, for example, indicating that the contents of the drawer are desired to be viewed. Other well-known methods can be used for communicating a desire to select an object for viewing its contents. For the present example, the contents of drawer 34 are desired to be viewed.

Figure 3:
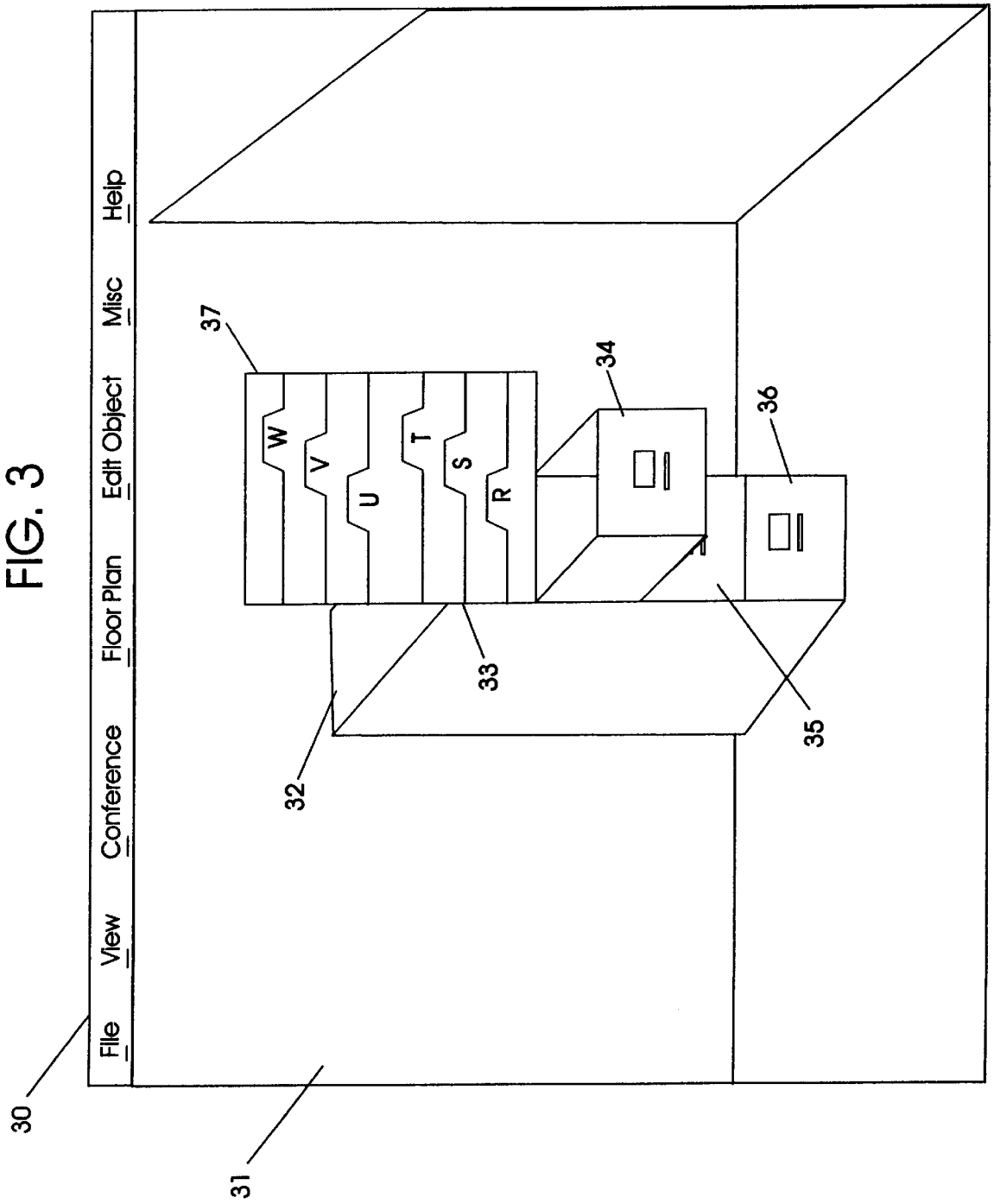
FIG. 3 is a pictorial representation of a graphical display showing the contents of an object according to the present invention.

FIG. 3 shows a pictorial representation of a graphical display showing the contents 37 of drawer 34 of storage cabinet 32. According to the invention, the contents are shown so that the viewport orientation does not change. The contents have been reoriented for viewing so that a user is not required to manually change the pitch of the viewport or manually change the orientation of the object's contents with respect to the pitch of the viewport. The contents of drawer 34, for this example, are different categories of items that have been alphabeticaly stored in the drawer and that can each be chosen by a user for more selective viewing.

Figure 4:
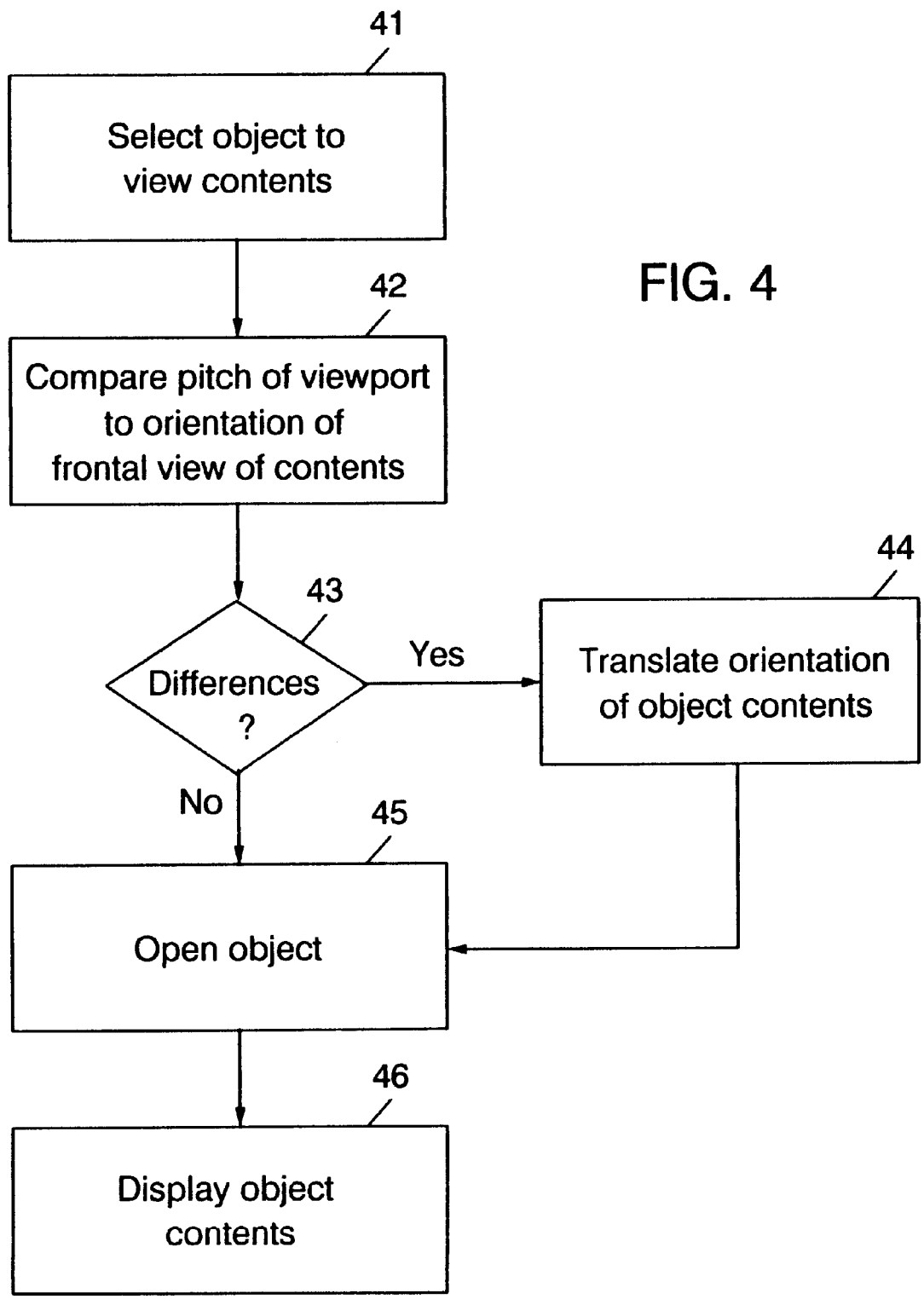
FIG. 4 shows a high level flowchart for the method displaying the contents of an object according to the present invention.

FIG. 4 shows a high level flowchart for the method 40 of showing the contents of an object according to the present invention. At step 41, an object, such as drawer 34, is selected by a user by, for example, positioning a cursor on the object and clicking a mouse button. At step 42, the pitch of the viewport is compared to the orientation of a frontal view of the contents of the object. At step 43, it is determined whether there are differences between the pitch of the viewport and the orientation of the frontal view of the contents. If there are differences, flow continues to step 44 where the frontal view orientation of the object contents is translated to be in a plane that is perpendicular to the pitch of the viewport. Flow then continues to step 45, where the display is changed to show the object in an opened position, such as drawer 33 shown in FIG. 3. Once the object is fully opened or extended, the frontal view of the contents of the object are displayed at step 46 so that the contents can be viewed using the current viewport.

While the present invention has been described in connection with the illustrated embodiments, it will be appreciated and understood that modifications may be made without departing from the true spirit and scope of the invention.

We claim:

1. A method for displaying information in a virtual reality environment, the method comprising the steps of:

selecting an object in a virtual reality environment, the object being within a viewport into the virtual reality environment and having contents that are to be displayed;

opening the object; and responsive to opening the object, orienting the contents of the object so that the contents are perpendicular to a line of sight of the viewport, wherein the step of orienting the contents of the object includes the steps of:

comparing the pitch of the viewport to an orientation of a frontal view of the contents of the object, translating the orientation of the frontal view of the contents of the object to be perpendicular to the pitch of the viewport when there is a difference between the pitch of the viewport and the orientation of the frontal view of the contents of the object, and displaying the translated orientation of the frontal view of the contents of the object.

2. A program storage device, comprising:

a storage area; and information stored in the storage area, the information being readable by a machine, and tangibly embodying a program of instructions executable by the machine for performing method steps comprising:

selecting an object in a virtual reality environment, the object being within a viewport into the virtual reality environment and having contents that are to be displayed;

opening the object; and responsive to opening the object, orienting the contents of the object so that the contents are perpendicular to a line of sight of the viewport, wherein the method step of orienting the contents of the object includes the steps of:

comparing the pitch of the viewport to an orientation of a frontal view of the contents of the object, translating the orientation of the frontal view of the contents of the object to be perpendicular to the pitch of the viewport when there is a difference between the pitch of the viewport and the orientation of the frontal view of the contents of the object, and displaying the translated orientation of the frontal view of the contents of the object.

3. The program storage device according to claim 2, wherein the memory includes at least one of a storage device and CD-ROM.

4. A system for displaying information in a virtual reality environment, the system comprising:

means for selecting an object in a virtual reality environment, the object being within a viewport into the virtual reality environment and having contents that are to be displayed;

means for opening the object; and means, responsive to opening the object, for orienting the contents of the object so that the contents are perpendicular to a line of sight of the viewport, wherein the means for orienting the contents of the object includes:

means for comparing the pitch of the viewport to an orientation of a frontal view of the contents of the object, means for translating the orientation of the frontal view of the contents of the object to be perpendicular to the pitch of the viewport when there is a difference between the pitch of the viewport and the orientation of the frontal view of the contents of the object, and means for displaying the translated orientation of the frontal view of the contents of the object.

* * * * *